US012719290B1

(12) United States Patent
Rutherford et al.

(10) Patent No.: US 12,719,290 B1
(45) Date of Patent: Aug. 25, 2026

(54) STROLLER WITH COVER AND ELECTRONIC DEVICES

(71) Applicants: Jermaine Rutherford, Cincinnati, OH (US); Keira Jones, Cincinnati, OH (US)

(72) Inventors: Jermaine Rutherford, Cincinnati, OH (US); Keira Jones, Cincinnati, OH (US)

(*) Notice: Subject to any disclaimer, the term of this patent is extended or adjusted under 35 U.S.C. 154(b) by 448 days.

(21) Appl. No.: 18/237,246

(22) Filed: Aug. 23, 2023

(51) Int. Cl.
*H02J 7/14* (2006.01)
*B62B 7/14* (2006.01)
*B62B 9/08* (2006.01)

(52) U.S. Cl.
CPC .............. *H02J 7/1415* (2013.01); *B62B 7/14* (2013.01); *B62B 9/087* (2013.01); *H02J 7/1423* (2013.01)

(58) Field of Classification Search
CPC .......... H02J 7/1415; H02J 7/14; H02J 7/1423; B62B 7/14; B62B 9/087
See application file for complete search history.

(56) References Cited

U.S. PATENT DOCUMENTS 9,452,769 B1 * 9/2016 Williams ............... A47C 7/748
9,669,858 B2 6/2017 Washington
9,738,300 B2 8/2017 Georgiev
10,557,602 B1 * 2/2020 Dejesus .................... B62B 9/26
10,763,767 B2 * 9/2020 French ...................... B62B 9/00
11,008,035 B1 * 5/2021 Walker ...................... B62B 9/08
11,485,398 B2 * 11/2022 Xie ......................... B62B 7/062
11,618,493 B2 * 4/2023 Jackson .................... B62B 9/00 280/769
2018/0236913 A1 * 8/2018 Abreu ....................... B62B 9/14
2024/0075974 A1 * 3/2024 Noel ..................... B62B 5/0053

FOREIGN PATENT DOCUMENTS

KR 20160145405 A * 12/2016 ............... B62B 9/00
KR 20220118326 A * 8/2022 ........... B62B 5/0056

* cited by examiner

*Primary Examiner* — John D Walters
(74) *Attorney, Agent, or Firm* — Sanchelima & Associates, P.A.; Christian Sanchelima; Jesus Sanchelima

(57) ABSTRACT

A stroller with cover and electronic devices including a structure assembly, a charging system assembly, and a stroller assembly. The structure assembly provides support and mobility to the seat structure, which is designed to accommodate a child. The seat structure is connected to the handle structure, allowing the user to push or pull the stroller. The wheels incorporate a dynamo charging system that charges multiple battery packs integrated into the adult's tray and child's tray. These battery packs can be charged via a solar panel strip or using a home battery charger. The adult's tray and child's tray include various electronic devices, such as a stroll light, cup holder with heating and cooling system, adjustable attachment cover, and lights. These features are controlled through a graphical user interface on an external mobile device paired with the adult's tray.

18 Claims, 8 Drawing Sheets

STROLLER WITH COVER AND ELECTRONIC DEVICES

1. FIELD OF THE INVENTION

The present invention relates to a stroller and, more particularly, to a stroller with cover and electronic devices that includes speakers and lights powered by means of a rechargeable battery electrically connected to a dynamo charging system coupled to the wheels and to a solar panel strip, wherein the solar panel strip is mounted on the rim of the canopy. The stroller further includes a variety of interactive trays for children and adults.

2. DESCRIPTION OF THE RELATED ART

Several designs for strollers with covers and electronic devices have been designed in the past. None of them, however, include electronic devices operatively actuated by means of controls and/or an external mobile device, wherein electronic devices such as speakers, lights, thermic attachment cover, stroll light and interactive trays, are powered by a battery which is capable of being charged via a dynamo charging system coupled to the stroller wheels and/or via a solar panel strip mounted on the canopy. The stroller further includes a tray which is removably attachable to the frame, wherein the wiring goes through the frame.

Applicant believes that a related reference corresponds to U.S. Pat. No. 9,738,300 issued for carrying apparatus. Applicant believes that another related reference corresponds to U.S. Pat. No. 9,669,858 issued for remote controllable self-propelled stroller. None of these references, however, teach of a wheeled frame that supports a convertible seat and with retractable cover, wherein the interior of the seat area includes a programmable lighting system powered by an on-board battery. The battery is charged via a dynamo charging system driven by the stroller wheels and/or solar cell. In yet another embodiment, the present invention includes a charging pad that is electrically connected to the battery pack, allowing for convenient charging of electronic devices. The battery packs are integrated into both the adult's tray and the child's tray. The battery pack can be recharged through a solar panel strip, a dynamic charging system, or by removing the battery pack and charging it at home.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a device with a variety of interactive trays for kids including a tablet, lights, and cup holders.

It is another object of this invention to provide a device with optional electronic features, such as adjustable temperature devices that can be controlled through the adult's tray.

It is still another objective of the present invention is to provide a device that incorporates multiple electronic components for both kids and parents, all controlled either through an adult's tray or via a smartphone app.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an operational view of an exemplary embodiment of the present invention 10.

FIG. 2 shows an isometric view of the present invention 10, wherein attachment cover 66 is removably attachable to the seat 64.

FIG. 2A illustrates an isometric view of the present invention 10 wherein the attachment cover 66 is removable attachable from the seat 64.

FIG. 3 illustrates an isometric view of the present invention 10 representing the child's tray 72 being removable and attachable to the electrical connector 77.

FIG. 4 is a representation of a diagram of the electronic components operatively connected therebetween, wherein the attachment cover 66, stroll light 70*a*, and the adult's tray 69 are powered by the first battery pack 44, and the child's tray 72 is powered by means of a second battery pack 45, wherein both first battery pack 44 and second battery pack 45 are either recharged via the dynamo charging system 26, the solar panel strip 74 or at home. The processor 63 receives, collects, and transmits data to operate the electronic features of the present invention 10 through the adult's tray 69 or via an external mobile device 100.

FIG. 4A depicts a block diagram of the data received by the processor 63 and memory 67 from the control means 69 or external mobile device 100 to actuate and monitor the charging pad 71, attachment cover 66, cup holder 78, lights 72, stroll light 70*a*, child's tray speakers 72*d* and adult's tray speaker's 65.

V. DETAILED DESCRIPTION OF THE EMBODIMENTS OF THE INVENTION

Figure 1:
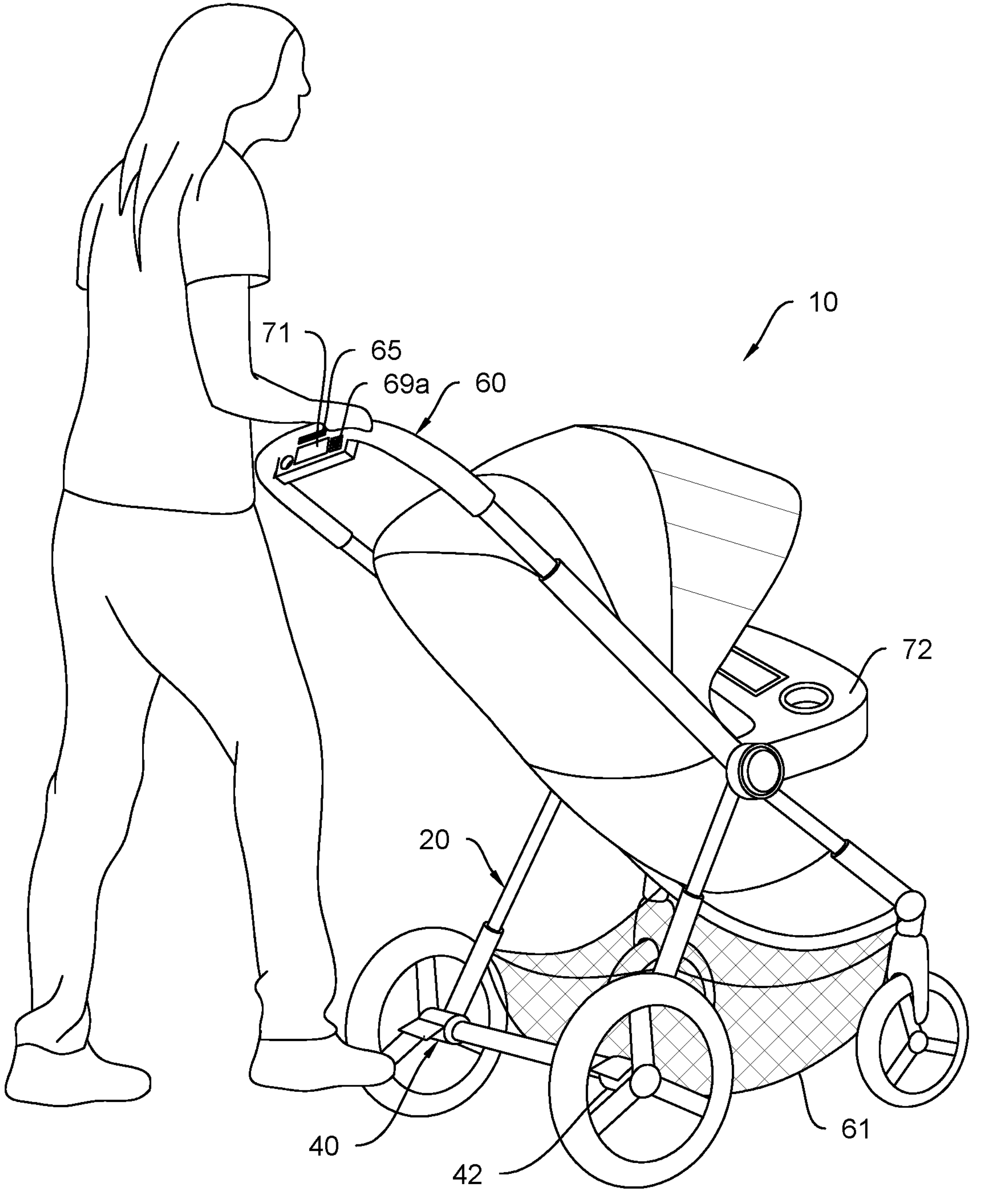

Referring now to the drawings, where the present invention is generally referred to with numeral 10, it can be observed that it basically includes a structure assembly 20, a charging assembly 40, a stroller assembly 60, and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
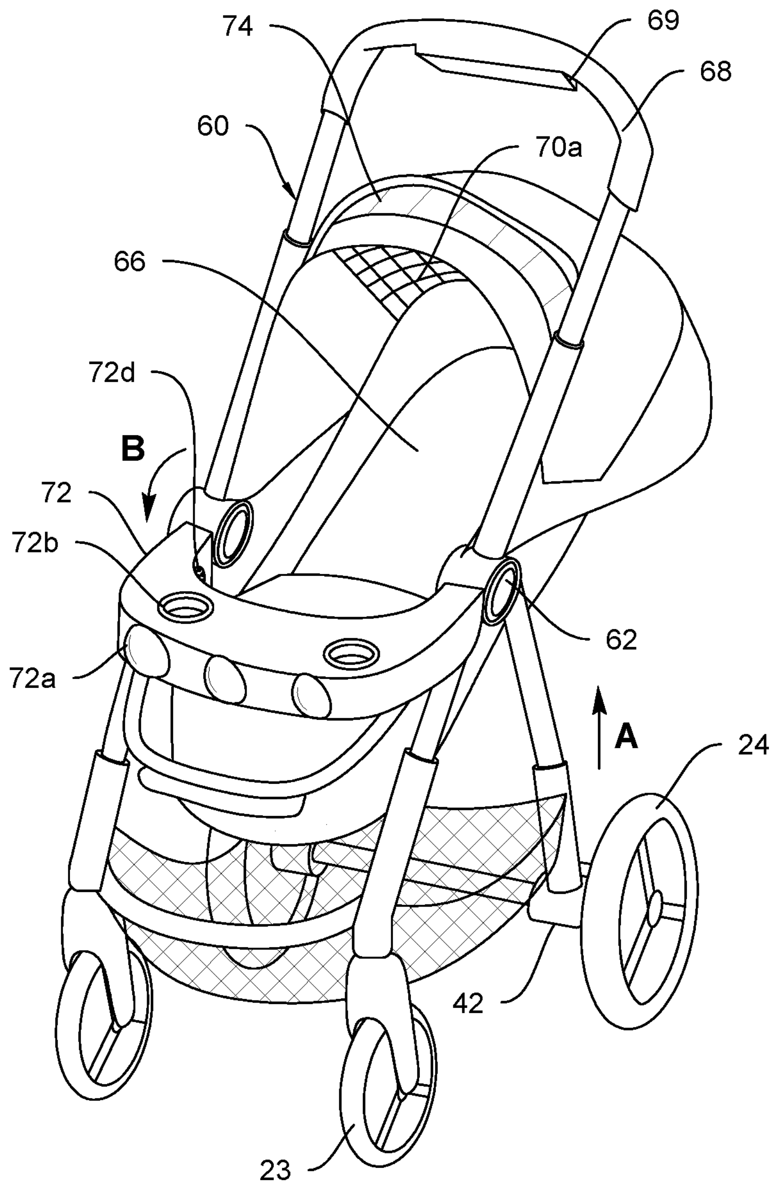

Structure assembly 20 including wheel's structure 22, front wheels 23, and rear wheels 24. In an exemplary embodiment, the wheel's structure 22 may be made of a tubular structure, such as structural metal, aluminum, or any other suitable material that connects the front wheels 23 and the rear wheels 24. It should be considered that the rear wheels 24 and the front wheels 23 may have different diameters therebetween, wherein the rear wheels are fixed in a predetermined orientation. A dynamo charging system 42 is coupled in at least one of the rear wheels 24 and/or front wheels. Nonetheless, the wheel's structure 22 and the rear wheels 24 may be connected therebetween, and the dynamo charging system 42 may be coupled on a predetermined position of the wheel's structure 22 allowing the dynamo charging system to convert the mechanical energy into electricity by means of the rotational motion transmitted by the rear wheels. In a suitable embodiment, the front wheels 23 are structurally coupled to the wheels structure 22, as FIG. 2 illustrates. This coupling allows the front wheels 23 to rotate 360 degrees, thereby the user may control the orientation of the wheels structure through the front wheels 23, as FIG. 1 shows. Structure assembly 20 further includes a locking mechanism, such as brakes 25 mounted in at least one wheel of the front wheels 23 and rear wheels 24, wherein the brakes 25 inhibits rotational motion of the front wheels 23 and rear wheels 24 by actuating a lever. The lever blocks and unblocks the rear wheels 24 or front wheels 23, allowing the present invention 10 to remain in place. In a preferred embodiment, wheel's structure 22 may be adjustable in height, as FIG. 2 illustrates, allowing a seat 64 to be adjusted in height as the user may consider appropriate. For instance, the seat 64 may be parallelly adjusted to a dinner's table height or the like.

Figure 3:
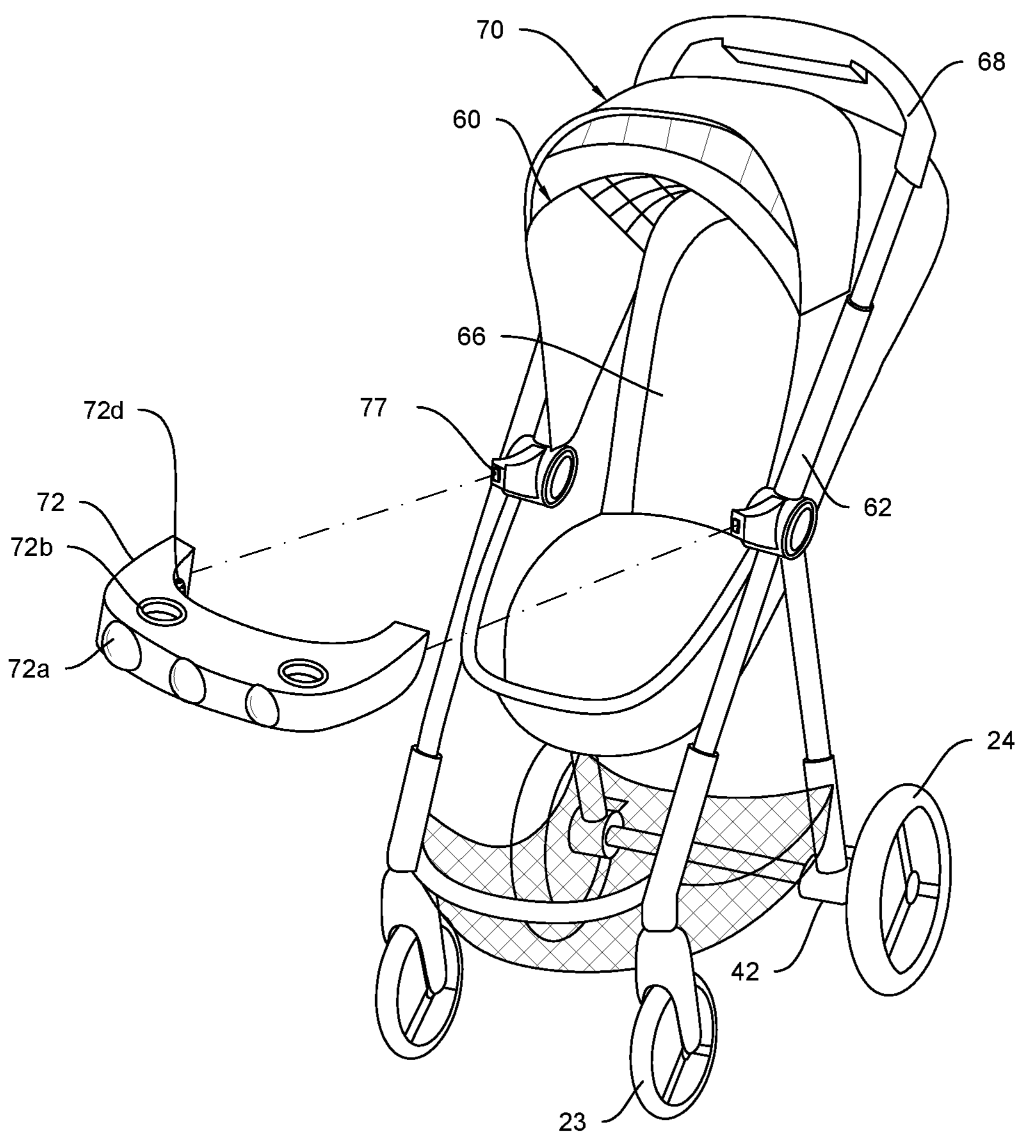

Charging assembly 40 includes the dynamo charging system 42, a first battery pack 44, and a second battery pack 45. In an exemplary embodiment, the dynamo charging system 42 is a device that converts motive power, such as mechanical energy caused by the rotational motion of the rear wheels 24 and/or front wheels 23 into electricity. The dynamo charging system 42 is a device for converting mechanical energy into electrical energy. The dynamo charging system is mounted on the rear wheels 24 and/or the front wheels 23. A bottom portion of the wheel's structure 22 has cylindrical members horizontally oriented with openings adapted to house and hold the dynamo charging system 42 therein, thereby the dynamo charging system 42 may be housed inside said cylindrical housing of the wheel's structure 22, allowing the dynamo charging system 42 to be hold in place when the front wheels 23 and rear wheels 24 rotate, as FIG. 2 and FIG. 3 illustrates. It should be considered that the coupling between the dynamo charging system 42 and the rear wheels 24 and/or front wheels 23 may include a locking mechanism allowing the user to couple and uncouple the dynamo charging system 42 for charging the first battery pack 44 or to allow the rear wheels 24 and/or front wheels 23 to have a rotational motion degree of freedom. In a preferred embodiment, first battery pack 44 and second battery pack 45 are rechargeable batteries built inside the adult's tray 69 and child's tray 72 respectively. Nonetheless it should be considered that the battery pack 44 may be mounted in any other suitable place of the present invention 10. First battery pack 44 and second battery pack 45 are electrically connected to the dynamo charging system 42 and to a solar panel strip 74 to be recharged. In a suitable embodiment, first battery pack 44 and second battery pack 45 are further recharged at home by means of a charger device well known in the art, removing either the first battery pack 44 or second battery pack 45 from the adult's tray 69 or child's tray 72 respectively.

Stroller assembly 60 includes a basket 61, a seat structure 62, the seat 64, speakers that are mounted on the adult's tray 69, hereinafter referred to as adult's tray speakers 65, an attachment cover 66, a handle structure 68, the adult's tray 69, control means 69*a*, such as buttons, a canopy 70, stroll light 70*a*, the child's tray 72, lights 72*a*, cup holders 72*b*, solar panel strip 74, and a cup holder 78. In an exemplary embodiment, the seat structure 62 may be a structural member mechanically connected to the wheels structure 22. Seat structure 62 may comprise tubular members telescopically coupled therebetween configured to be extended and retracted, wherein said tubular members are adapted to support the seat 64 by means of a coupling member. As best depicted in FIG. 2. As FIG. 3 shows. It should be considered that the front portion of the seat structure 62 is configured to receive and hold in place the child's tray 72 through an electrical connector 77, as best depicted in FIG. 3. The child's tray 72 may have a rectangular shape with rounded corners, a transitional convex top edge, and a transitional concave bottom edge. In a preferred embodiment, the child's tray 72 features a flat surface with integrally formed cup holders 72*b*. Cup holders 72*b* are configured to receive liquid containers, such as bottles, baby bottles or the like. In one embodiment, the child's tray 72 may include the lights 72*a* integrated at the convex side of the child's tray 72 to light up a darkened area. Lights 72*a* may be LEDs to light up darkened areas when walking at night. In one embodiment child's tray 72 further includes child's tray speakers 72*d* for reproducing media through the adult's tray, as best illustrated in FIG. 2. Nonetheless, it may be considered that child's tray speakers 72*d* may be positioned in any portion of the handle structure 68 or wheel's structure 22. In one embodiment, the adult's tray 69 may be an electronic device with a casing removably attachable to the handle structure 68 and conveniently oriented towards the user. Adult's tray features the control means 69, the charging pad 71 and the cup holder 78 built inside the adult's tray 69. It should be considered that the adult's tray 72 may include the proper circuitry, such as a memory 67 and a processor 63 for controlling the lights 72*a*, the stroll light 70*a*, the charging pad 71, the attachment cover 66, and the cup holder 78, as best illustrated in FIG. 4A. Cup holder 78 features a heating and cooling system to warm up or cool down a predetermined beverage as the user considers appropriate.

Figure 4:
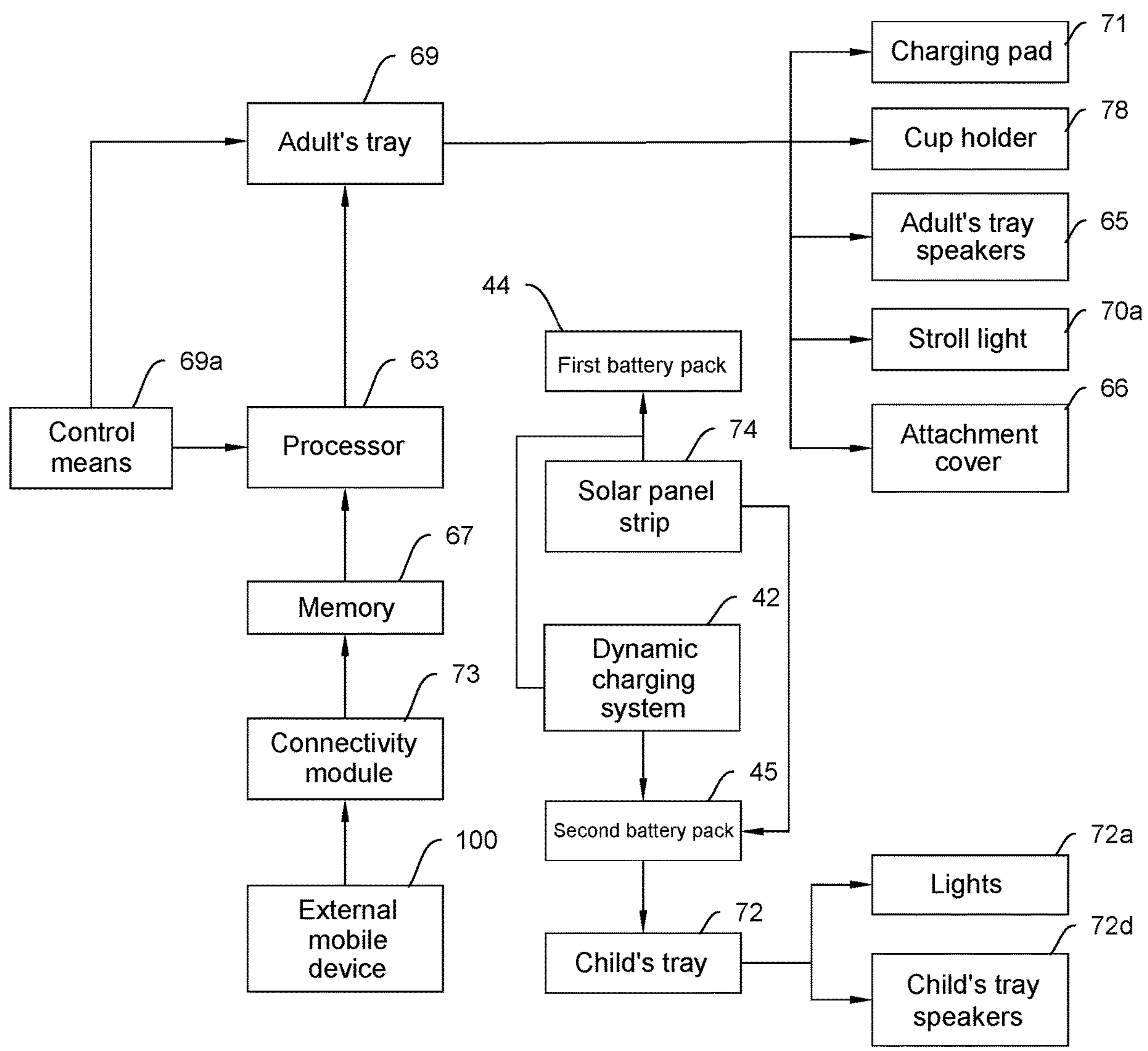
Figure 4A:
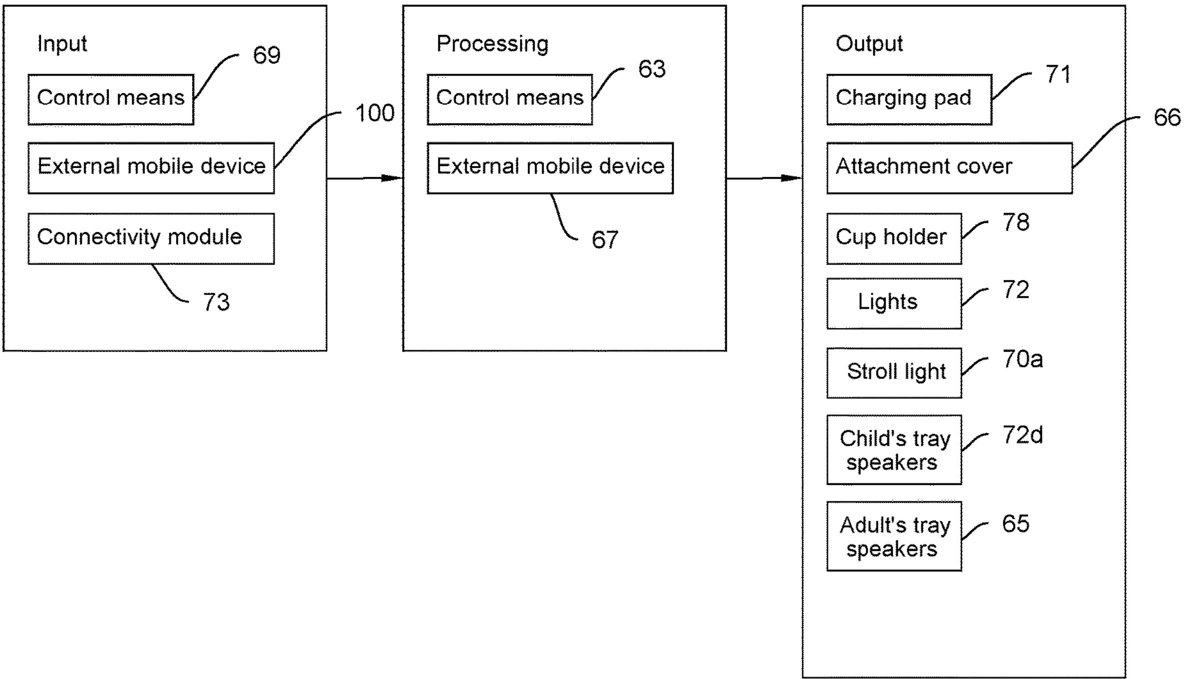

Referring to the figures and more particularly to FIG. 4, the adult's tray is equipped with the memory 67, processor 63 and a connectivity module 73. In a preferred embodiment, connectivity module 73 includes the proper software and hardware to allow the external mobile device 100, such as a smartphone, tablet or the like to establish a wireless connection with the adult's tray 69*a*, enabling convenient remote-control capabilities. Memory 67 stores relevant data and settings, enhancing user customization. Additionally, the processor 63 receives and processes commands from the control means 69*a*. External mobile device 100 is capable of controlling and monitoring the charging pad 71, attachment cover 66, cup holder 78, lights 72, stroll light 70*a*, child speakers 72*d*, and adult's tray speakers 65 by means of an app, a graphical user interface or the like integrated or installed in the external mobile device 100. In one embodiment, attachment cover 66 may be a universal cover made of a cushion material that is adapted to receive a child when sitting. Attachment cover 66 may fit to any car seat known in the art when removed from seat 64. Attachment cover 68 when adapted to the seat 64 may be capable of being electrically connected to the child's tray 72, providing heating and cooling features. Handle structure 68 may be formed by a curved tubular structure structurally connected to the seat structure 62, wherein said handle structure is configured to be grasped, pulled, or pushed by the user. The attachment cover 66 is adjustable in temperature by means of a thermoelectric device and/or mechanism, thereby the attachment cover 66 is cooled or warmed as the user may consider appropriate. Adult's tray 69 may be a rectangular-shaped case with a recessed area to receive, hold and charge the external mobile device. The recessed area defines the charging pad 71, as FIG. 1 represents. In a suitable embodiment, charging pad 71 may use electromagnetic induction to transfer power from the charging pad 71 to a compatible external mobile device 100 without the need for physical cables or connectors. The charging pad 71 and the device must be in proximity for efficient power transfer. Nonetheless, the charging pad 71 may use any other suitable technology from the art to wirelessly charge an external device.

Figure 5:
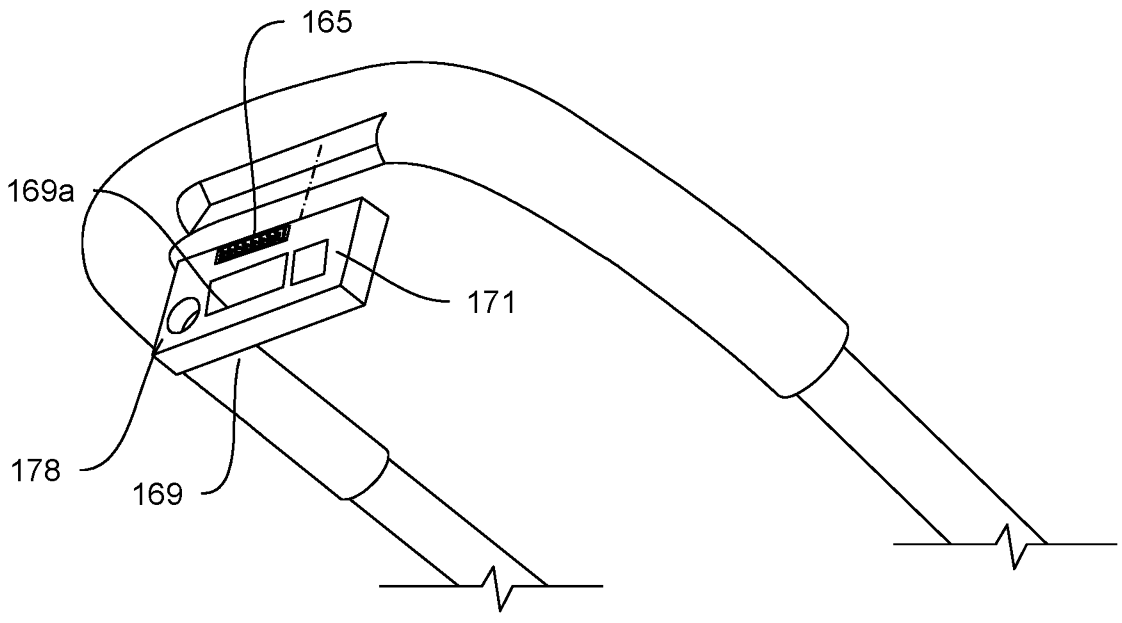
FIG. 5 represents an alternative embodiment of the adult's tray 169 featuring a touch screen as control means 169*a*.

In a suitable variation, adult's tray 169 may be a device with a housing mounted on a portion of the handle structure 68, wherein adult's tray 169 includes a cup holder 178 with a heating and cooling system integrated therein. Adult's tray 169 includes control means 169*a*, such as a touch screen device built into thereof. In a top portion of the adult's tray 169 a charging pad 171 is placed to charge wirelessly the external mobile device 100. In a suitable embodiment, adult's tray 169 further includes speakers 165 in a top portion thereof. As FIG. 5 depicts.

Stroller assembly further 60 includes a basket 61 below the seat 64. The basket 61 serves as a storage compartment for a plurality of items. In a suitable embodiment, electrical connector 77 is an electrical port to receive the child's tray 72 and is electrically connected to the adult's tray 69, thereby child's tray 72 may power the charging pad 71, cup holder 78, adult's tray speakers, stroll light 70*a*, attachment cover 66, lights 72 and child's tray speakers 72*d* through the second battery pack 45 incorporated into the child's tray 72.

Figure 6:
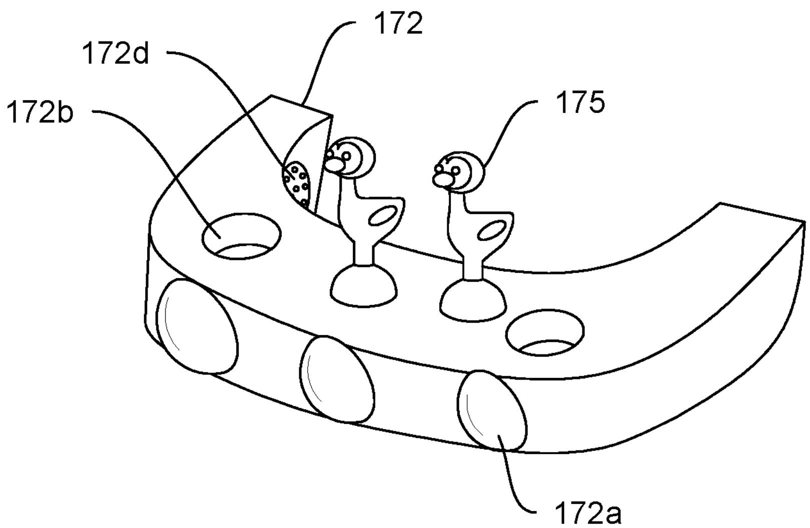
FIG. 6 illustrates a suitable variation of the child's tray 172 including child's toys 175.

In a suitable variation, child's tray 72 may be adaptable to suit different age groups of children. Child's tray 72 may be customized or adjusted based on the specific needs and development stages of the child. Thereby, in a preferred embodiment, child's tray 172 may be used by children within a range of 3-6 months, wherein child's tray 172 may have a rectangular shape with rounded corners and a transitional convex top edge and a transitional concave bottom edge. In a preferred embodiment, the child's tray 172 may have a flat surface, where a plurality of child's toys 175 are mounted thereon, as FIG. 6 represents. Child's tray 172 features lights 172*a* in a front portion thereof to light up darkened areas when walking at night, and child's tray 172 further includes integrally formed cup holders 172*b*.

Figure 7:
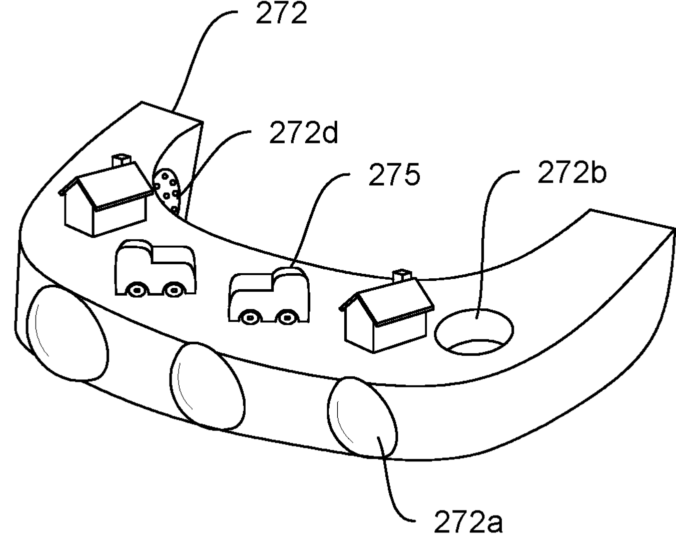
FIG. 7 depicts a suitable variation of the child's tray 272 including child's toys 275.

In other suitable variation, child's tray 272 may be adaptable to suit different age groups of children within a range of 6-9 months, wherein child's tray 272 may have a rectangular shape with rounded corners and a transitional convex top edge and a transitional concave bottom edge. In a preferred embodiment, the child's tray 272 may have a flat surface, where a plurality of child's toys 275 are mounted thereon. As FIG. 7 represents. Child's tray 272 features lights 272*a* in a front portion thereof to light up darkened areas when walking at night, and child's tray 272 further includes integrally formed at least one cup holder 172*b*. It should be considered for child's tray 272 to include indicia or decorative elements configured to catch the attention of a child.

Figure 8:
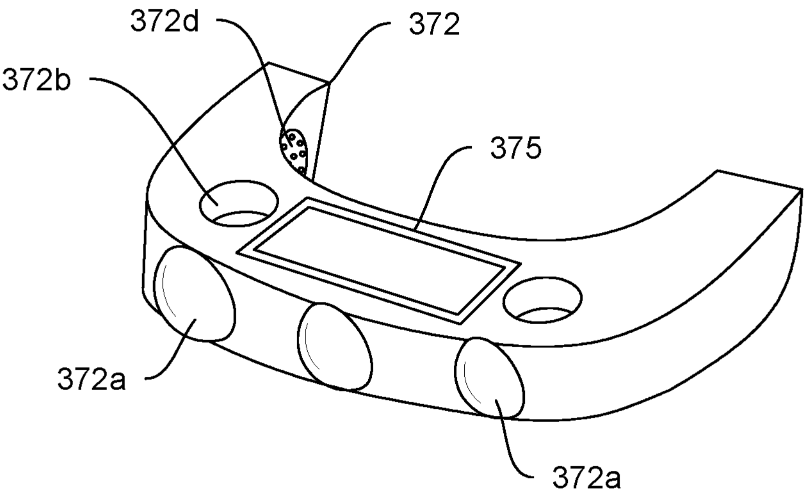
FIG. 8 shows a suitable variation of the child's tray 372 featuring a tablet 375.

In another suitable variation, child's tray 372 may be used by children within a range of 9 months and beyond, wherein child's tray 372 may have a rectangular shape with rounded corners and a transitional convex top edge and a transitional concave bottom edge. In a preferred embodiment, the child's tray 372 may have a flat surface, where a tablet 375 mounted thereon. The tablet 375 includes learning games, activities, and media built into therein. As FIG. 8 represents. Child's tray 372 features lights 372*a* in a front portion thereof to light up darkened areas when walking at night, and child's tray 372 further includes integrally formed cup holders 372*b*.

Referring to FIG. 2, the handle structure 68 may be an adjustable tubular structure over the seat 68 mechanically connected to both sides of the seat structure 62, wherein the handle 68 may be adjustable in length and rotationally adjustable with respect to a horizontal plane (not shown in the drawings). The handle includes a padded section configured to be used by the user. In a suitable embodiment, control means 69*a* on the adult's tray 69 may control the attachment cover 66, the adult's tray speakers 65 and the stroll light 70*a*. It should be considered that the adult's tray 69 may include the proper circuitry to connect and actuate the foregoing elements. Adult's tray 69 further includes a transmitter device that sends instructions to the external mobile device 100, thereby the user may send a receive data to actuate the attachment cover 66, adult's tray speakers 65 and stroll light 70*a* by means of graphical user interface integrated in the external mobile device 100 which interacts with said elements. As FIG. 4 illustrates. In a suitable embodiment, the cup holder 78 and cup holders 72*b* may be configured to receive and support a can, a bottle, or any other suitable liquid container. In one embodiment, adult's tray speakers 65 may be integrated into the adult's tray, thereby the adult's tray speakers 65 may play audio media when connected to the external mobile device 100.

Figure 2A:
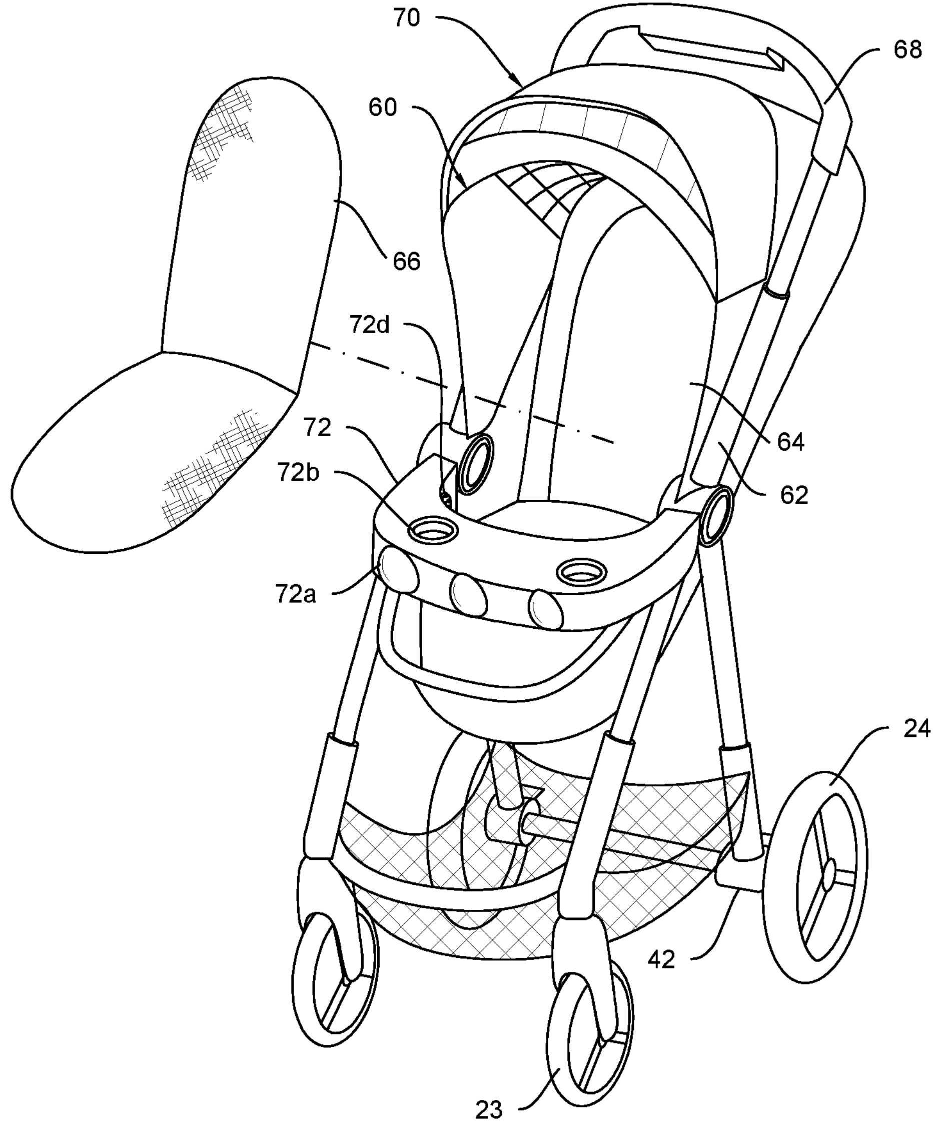

In an exemplary embodiment, the seat 64 further includes a canopy 70 mounted on top thereof, wherein the canopy includes the solar panel strip 74 coupled on a front side thereof, as FIG. 2A illustrates. The canopy 70 may have a curved or half-circular shape member that covers a portion of the seat 64. It should be considered that seat 64 may be configured to be inclined backwards to further return to its original position as the user may consider appropriate, as best depicted in FIG. 2 and FIG. 3. The solar panel strip 74 may be a flexible strip that conforms to the shape of the canopy 70, where the solar panel strip 74 is electrically connected to the first battery pack 44 in conjunction or separately with respect to the dynamo charging system 42. In an exemplary embodiment, stroll light 70*a* may be a plurality of LED lights embedded inside the canopy 70. Stroll light 70*a* may be configured to depict or illustrate a predetermined image over the internal side of the canopy 70, thereby the stroll light 70*a* when actuated may project preconfigured images, such as letters, clouds, stars, rainbows, numbers etc. Stroll light 70*a* is electrically connected to the first battery pack 44 and operatively controlled by the adult's tray 69 and further by the external mobile device 100. It should be considered that the present invention 10 may include the proper circuitry and the proper harnesses to receive and connect the attachment cover 66, the solar panel strip 74 and the stroll light 70*a*.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A stroller with cover and electronic devices, comprising:

a structure assembly including wheel's structure, front wheels, rear wheels, brakes, wherein said rear wheels and said front wheels are structurally connected by means of said wheel's structure, said front wheels are capable of rotating 360 degrees with respect to a longitudinal plane to provide direction and orientation to said wheel's structure;

charging assembly having a dynamo charging system, a battery, and a second battery, wherein said dynamo charging system is incorporated on at least said rear wheels or said front wheels, said dynamo charging system is capable of transforming a mechanical energy caused by a rotational motion of said rear wheels or said front wheels into electrical energy to charge said first battery pack and said second battery pack; and a stroller assembly including a basket, a seat structure, a processor, a seat, adult's tray speakers, an attachment cover, a memory, a handle structure, and adult's tray, control means, a canopy, a stroll light, a charging pad, a child's tray, lights, child's tray speakers, a solar panel strip, an electrical connector, a cup holder, cup holders, and an attachment cover, wherein said basket is a storage compartment below said seat, said seat is adapted to receive a child, said handle structure is structurally connected to said seat structure, said wheel's structure is configured to provide a frame for receiving and supporting said seat, said adult's tray is removable attachable to said handle structure and operatively connected to said child's tray, wherein said child's tray is removably attachable to a front portion of said seat structure, said canopy is mounted on top of said seat, wherein said stroll light is mounted in an internal side of said canopy, said solar panel strip is mounted on a top portion of said canopy to receive and convert sunlight into electricity to charge said first battery pack and said second battery pack, said adult's tray incorporates said processor, said memory and further a connectivity module to actuate said stroll light, said charging pad, said lights, said attachment cover and said cup holder.

2. The stroller with cover and electronic devices of claim 1, wherein said brakes are a locking mechanism integrated into said rear wheels to hold in place said wheel's structure.

3. The stroller with cover and electronic devices of claim 1, wherein said wheel's structure is adjustable in height.

4. The stroller with cover and electronic devices of claim 1, wherein said seat structure has a reclining configuration.

5. The stroller with cover and electronic devices of claim 1, wherein said connectivity module establishes a wireless connection with an external mobile device.

6. The stroller with cover and electronic devices of claim 5, wherein said external mobile device is capable of controlling a monitoring said charging pad, said attachment cover, said cup holder, said lights, said stroll light, said child's tray speakers, and said adult's tray speakers through a graphical user interface.

7. The stroller with cover and electronic devices of claim 1, wherein said charging pad is integrated into said adult's tray to charge wirelessly said external mobile device.

8. The stroller with cover and electronic devices of claim 1, wherein said cup holder is integrated into said adult's tray and further includes a heating and cooling system to warm up or cool down a predetermined container when inserted inside said cup holder.

9. The stroller with cover and electronic devices of claim 1, wherein said lights are LED lights mounted on a front portion of said child's tray to light up a predetermined area.

10. The stroller with cover and electronic devices of claim 1, wherein said stroll light is made of a plurality of LED lights integrated into said canopy to display a predetermined image.

11. The stroller with cover and electronic devices of claim 1, wherein said control means are buttons or a touch screen integrated into said adult's tray to control said charging pad, said attachment cover, said cup holder, said lights, said adult's tray speakers and said child's tray speakers.

12. The stroller with cover and electronic devices of claim 1, wherein said attachment cover is adjustable in temperature, said attachment cover is configured to cover said seat.

13. The stroller with cover and electronic devices of claim 1, wherein said first battery pack and said second battery pack are integrated inside said adult's tray and said child's tray respectively.

14. The stroller with cover and electronic devices of claim 1, wherein said first battery pack and said second battery pack are capable of being removed from said adult's tray and said child's tray for charging in a charger at home.

15. The stroller with cover and electronic devices of claim 1, wherein said cup holders are integrally formed into said child's tray to receive and hold liquid containers.

16. The stroller with cover and electronic devices of claim 1, wherein said child's tray includes interchangeable features according to an infant's age.

17. A stroller with cover and electronic devices, comprising:

a structure assembly including wheel's structure, front wheels, rear wheels, and brakes, wherein said rear wheels and said front wheels are structurally connected by means of said wheel's structure, said front wheels are capable of rotating 360 degrees with respect to a longitudinal plane to prove direction and orientation to said wheel's structure, wherein said brakes are a locking mechanism integrated into said rear wheels to hold in place said wheel's structure;

charging assembly having a dynamo charging system, a battery, and a second battery, wherein said dynamo charging system is incorporated on at least said rear wheels or said front wheels, said dynamo charging system is capable of transforming a mechanical energy caused by a rotational motion of said rear wheels or said front wheels into electrical energy to charge said first battery pack and said second battery pack; and a stroller assembly including a basket, a seat structure, a processor, a seat, adult's tray speakers, an attachment cover, a memory, a handle structure, and adult's tray, control means, a canopy, a stroll light, a charging pad, a child's tray, lights, child's tray speakers, a solar panel strip, an electrical connector, a cup holder and, cup holders, wherein said basket is a storage compartment below said seat, said seat is adapted to receive a child, said handle structure is structurally connected to said seat structure, said wheel's structure provides a frame to receive and support said seat, said adult's tray is removable attachable to said handle structure and operatively connected to said child's tray, wherein said child's tray is removably attachable to a front portion of said seat structure, said canopy is mounted on top of said seat, wherein said stroll light is integrated in an internal side of said canopy, said solar panel strip is mounted on a top portion of said canopy to receive and convert sunlight into electricity, said first battery pack and said second battery pack are charged by said solar panel strip, said adult's tray incorporates said processor, said memory and further a connectivity module to actuate said stroll light, said charging pad, said lights, said attachment cover and said cup holder, wherein said seat structure has a reclining configuration, said connectivity module includes a software and hardware to establish a wireless connection with an external mobile device, said external mobile device is capable of controlling and monitoring said charging pad, said attachment cover, said cup holder, said lights, said stroll light, said child's tray speakers, and said adult's tray speakers through a graphical user interface, said charging pad is integrated into said adult's tray to charge wirelessly said external mobile device, said cup holder is integrated into said adult's tray and further includes a heating and cooling system to warm up or cool down a predetermined container when inserted inside said cup holder.

18. A stroller with cover and electronic devices, consisting of:

a structure assembly including wheel's structure, front wheels, rear wheels, brakes, wherein said rear wheels and said front wheels are structurally connected by means of said wheel's structure, said front wheels are capable of rotating 360 degrees with respect to the longitudinal plane to prove direction and orientation to said wheel's structure, wherein said brakes are a locking mechanism integrated into said rear wheels to in place said wheel's structure, said wheel's structure is adjustable in height;

charging assembly having a dynamo charging system, a battery, and a second battery, wherein said dynamo charging system is incorporated on at least said rear wheels or said front wheels, said dynamo charging system is capable of transforming a mechanical energy caused by a rotational motion of said rear wheels or said front wheels into electrical energy to charge said first battery pack and said second battery pack; and a stroller assembly including a seat structure, a basket, a processor, a seat, adult's tray speakers, an attachment cover, a memory, a handle structure, and adult's tray, control means, a canopy, a stroll light, a charging pad, a child's tray, lights, child's tray speakers, a solar panel strip, an electrical connector, a cup holder and, and cup holders, wherein said basket is a storage compartment below said seat, said seat is adapted to receive a child, said handle structure is structurally connected to said seat structure, said wheel's structure provides a frame to receive and support said seat, said adult's tray is removable attachable to said handle structure and operatively connected to said child's tray, wherein said child's tray is removably attachable to a front portion of said seat structure, said canopy is mounted on top of said seat, wherein said stroll light is integrated inside an internal side of said canopy, said solar panel strip is mounted on a top portion of said canopy to receive and convert sunlight into electricity, said solar panel strip charges said first battery pack and said second battery pack, said adult's tray incorporates said processor, said memory and further a connectivity module to actuate said stroll light, said charging pad, said lights, said attachment cover and said cup holder by means of said control means or said external mobile device, wherein said seat structure has a reclining configuration, said connectivity module includes a software and hardware to establish a wireless connection with said external mobile device, said external mobile device is capable of controlling a monitoring said charging pad, said attachment cover, said cup holder, said lights, said stroll light, said child's tray speakers, and said adult's tray speakers through a graphical user interface, said charging pad is integrated into said adult's tray to charge wirelessly said external mobile device, said cup holder is integrated into said adult's tray and further includes a heating and cooling system to warm up or cool down a predetermined container when inserted inside said cup holder, said lights are LED lights mounted on a front portion of said child's tray to light up a predetermined area, said stroll light is made of a plurality of LED lights integrated into said canopy to display a predetermined image, said control means are buttons or touch screen integrated into said adult's tray to control said charging pad, said attachment cover, and said cup holder, said first battery pack and said second battery pack are integrated inside said adult's tray and said child's tray respectively, said first battery pack and said second battery pack are capable of being removed from said adult's tray and said child's tray for charging in a charger at home, said cup holders are integrally formed into said child's tray to receive and hold liquid containers, said child's tray includes interchangeable features according to the infant's age.

* * * * *